VARIABLE IMPEDANCE ACTIVE PULSE TRANSMISSION SYSTEM

Filed Oct. 3, 1968

2 Sheets-Sheet 1

United States Patent Office 3,538,352

Patented Nov. 3, 1970

3,538,352

VARIABLE IMPEDANCE ACTIVE PULSE TRANSMISSION SYSTEM

Jun-Ichi Nishizawa, Sendai, Japan, assignor to Semiconductor Research Foundation, Kawauchi, Sendai, Japan Filed Oct. 3, 1968, Ser. No. 766,033

Int. Cl. H03k 1/18

U.S. Cl. 307—265 9 Claims

ABSTRACT OF THE DISCLOSURE

A plurality of recurring T-shaped L–C–R networks are disposed at predetermined different locations and electrically connected in cascade with no reflection. Each network comprises a series element including a pair of serially connected inductors and a shunt element including a variable capacitance or inductance element and an Esaki diode connected in parallel to the element. The variable element responds to an applied signal to change in impedance and the Esaki diode responds to a scanning pulse to have a negative resistance less than the output impedance of the associated network to provide a width modulated pulse. These pulses are successively read out from the respective network to provide a series of signals successively arranged with respect to time and originating from the spatially distributed signals applied to the respective variable impedance element. Similarly a series of signals successively arranged with respect to time may be converted to a series of spatially distributed signals.

BACKGROUND OF THE INVENTION

This invention relates to variable impedance active pulse transmission systems for converting spatially distributed signals to signals successively arranged with respect to time and vice versa.

In order to accomplish such conversions, there have been heretofore proposed various solid state camera and optical display apparatus such as scanistors, scan generators, image sensors and the like. In these apparatus a scanning circuit involved has lacked the ability to self-shape waveforms transmitted therethrough, which could lead to the disadvantage that a scanning pulse used is varied to adversely affect the system operation or to limit the manner in which the information is read out.

SUMMARY OF THE INVENTION

According to the principles of the invention there is provided a variable impedance active pulse transmission system for converting spatially distributed signals to signals successively arranged with respect to time, comprising a plurality of recurring T-shaped L–C–R networks disposed at predetermined, spatially different locations and electrically connected in cascade to each other, each network having an output impedance substantially equal to an input impedance of the next succeeding network, the last one of the networks terminating in an impedance substantially equal to the output impedance thereof, a source of scanning pulse connected to the cascade connection of the networks, a series of signals applied to said networks, each network including a series element composed of a pair of serially connected inductors and a shunt element composed of a variable impedance element responsive to a different one of said signals to change in impedance and an electrically conductive device such as an Esaki diode having a negative resistance region and responsive to the scanning pulse to have a negative resistance lower than the output impedance of the network, the variable impedance element being electrically connected across the electrically conductive device, whereby the signal is width modulated in accordance with the change in impedance of the variable impedance element and amplitude modulated in accordance with the negative resistance of the electrically conductive device, and reading out circuit means including one reading out element electrically connected to each network to successively read out the modulated signals from the respective network.

In order to convert a series of signals successively arranged with respect to time to a series of spatially distributed signals, an input circuit is provided for applying electrical signals to be converted through the respective variable impedance elements similar to those as above described to the respective network similar to those as above described except for an electroluminescent element substituting the variable impedance element. Thereby the electroluminescent elements disposed in predetermined different locations display signals modulated in the similar manner as above described.

Accordingly it is an object of the invention to provide a new and improved variable impedance active pulse transmission system for converting signals from a spatial distribution to a time distribution or vice versa with a relatively simple construction.

It is another object of the invention to provide a variable impedance active pulse transmission system of the type as described in the preceding paragraph capable of modulating the pulse width, phase and/or amplitude of a pulse.

It is still another object of the invention to provide a variable impedance active pulse transmission system realizable in a integrated circuit.

BRIEF DESCRIPTION OF THE DRAWING

The invention will become more readily apparent from the following explanatory description taken in conjunction with the accompanying drawing in which.

DESCRIPTION OF THE PREFERRED EMBODIMENTS

Figure 1:
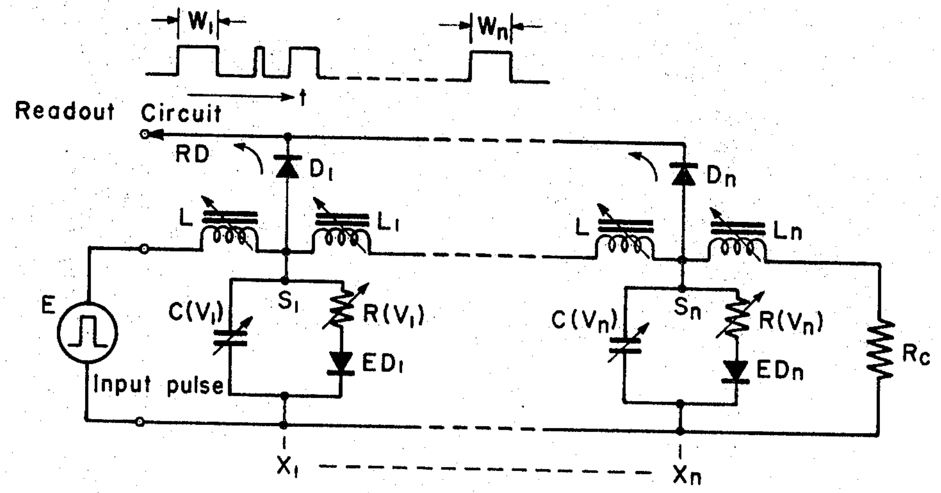
FIG. 1 is a schematic circuit diagram of a system for converting a series of spatially distributed signals to a series of signals successively arranged with respect to time in accordance with the principles of the invention.

Referring now to FIG. 1 of the drawing, it is seen that an arrangement disclosed herein comprises a plurality of cascade connected T-shaped L–C–R networks designated by the reference characters $S_1 \ldots S_n$ and terminating in the characteristic impedance $R_c$. Since the networks are substantially identical in construction to one another only a first one thereof will now be described in detail and the corresponding components of the remaining networks are designated by the corresponding reference characters with suffixed digits representing the serial numbers of the networks. The first T-shaped network $S_1$ includes a series element composed of a pair of serially connected inductor L and $L_1$ and a shunt element composed of a variable impedance element represented by a variable capacitance $C(V_1)$ and an electrically conductive device such as Esaki diode $ED_1$ having a negative resistance region and a variable resistor $R(V_1)$ serially connected to the device. The variable impedance element responds to a signal applied thereto to change in impedance and may be preferably a variable capacitance diode.

It is now assumed that when applied with a pulse the Esaki diode has a negative conductance $-G$ meeting the relationship $\sqrt{L/C} > |-1/G|$ where $\sqrt{L/C}$ represents the output impedance of the associated network. Under the assumed condition the network has the capability to cause a pulse passing therethrough to be self-shaped into a waveform having a pulse width W expressed by $W = k\sqrt{LC}$ where L and C are the magnitudes of the inductance and capacitance of the network and $k$ is a constant, and an amplitude determined principally by the voltage-to-current characteristic of the Esaki diode. Thus it will be appreciated that the arrangement illustrated has a property that a pulse applied thereto is permitted to be propagated along the same at a predetermined propagation speed while maintaining a predetermined waveform, in other words, the arrangement is the same in operation as the so-called neuristor.

The invention is based upon the utilization of the neuristor circuit just described as a circuit for scanning signals to convert them from one of spatial and time distributions to the other.

The arrangement shown in FIG. 1 is particularly suitable for use in converting spatially distibuted voltages or currents to the corresponding electrical quantities successively arranged with respect to time. To this end, the respective networks $S_1 \ldots S_n$ are positioned at predetermined spatially different locations where the voltage or currents are to be read out respectively. In order to read out the respective voltages or currents, one semiconductor diode $D_1 \ldots$ or $D_n$ is electrically connected between the junction of the inductor pair in each network and a common read out conductor RD and so poled that a voltage or current is permitted to pass from the associated network to the conductor RD therethrough as shown at the arrows in FIG. 1. Further a source of scanning or reading out pulse E is electrically connected across a pair of electric conductors of the transmission line illustrated at that end near to the first network $S_1$ to propagate a scanning or reading out pulse preferably in the form of a rectangle along the transmission line.

In order to ensure that the pulse is propagated along the line with no reflection, the series elements L'S and $L_1 \ldots L_n$ can be preset such that each T network has an output impedance substantially equal to the input impedance of the next succeeding network while the last network has terminated in the characteristic impedance $R_c$, to substantially eliminate the reflection loss. It is also assumed that the variable resistors $R(V_1) \ldots R(V_n)$ have been adjusted to render the negative resistances of the associated Easki diodes $ED_1 \ldots ED_n$ substantially equal to one another in response to a predetermined amplitude of a scanning pulse.

Under these circumstances, if voltages or currents represented by the reference characters $X_1 \ldots X_n$ labelled below the respective networks are applied to the variable capacitance diodes $C(V_1) \ldots C(V_n)$, the latter change their capacitances in accordance with the magnitudes of applied voltages or currents. When a scanning or reading out pulse form in the form of a rectangle from the source E is supplied to the transmission line, it is successively passed through the networks $S_1 \ldots S_n$ to be converted to pulses having durations or pulse widths determined by the effective magnitudes of the inductances and capacitances of the respective networks and the substantially same amplitude determined by the voltage-to-current characteristic of the associated Esaki diodes $ED_1 \ldots ED_n$ while being self-shaped by the respective networks. Therefore the reading out circuit can successively read out a series of these shaped pulses from the respective networks at intervals of time which are a function of the speed of the scanning pulse propagated along the transmission line. The read out pulses are shown at waveforms in the upper portion of FIG. 1. Thus it will be appreciated that the read out pulses have their durations or pulse widths which are functions of the changes in capacitances of the diodes $C(V_1) \ldots C(V_n)$ and are arranged successively with respect to time. Namely the pulses are width modulated.

It will be readily understood that if the Esaki diodes have been preset to have different negative resistances, or if the variable resistors in series to the respective Esaki diodes respond to input signals to differently change in resistance that the read out pulses are also amplitude modulated.

Figure 2:
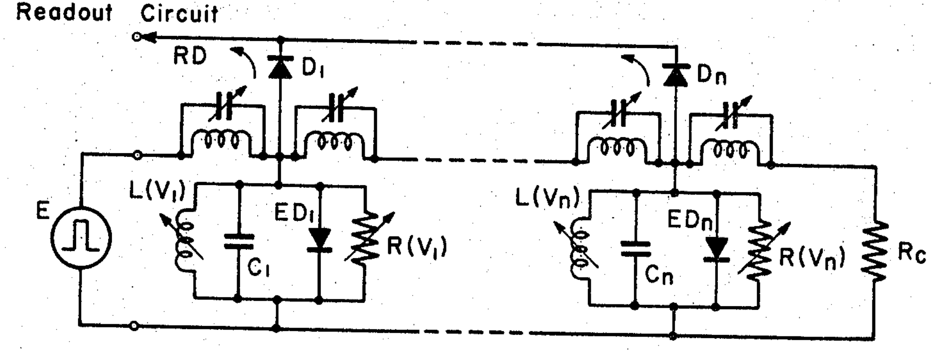
FIG. 2 is a view illustrating a modification of FIG. 1.

FIG. 2 shows a modification of the invention wherein the variable impedance element is a variable inductance element responsive to an input signal to change in inductance. As shown, each L–C–R network includes a variable inductance element L(V) in the position of the variable capacitance element as shown in FIG. 1 and a capacitance is provided by both a fixed capacitor C shunting across the variable inductance element and one capacitor connected across each inductor. Further a variable resistance R(V) is electrically connected in parallel rather than in series to an Esaki diode. In other respects the arrangement is similar to that illustrated in FIG. 1 and therefore it is operative in the same manner as does the arrangement of FIG. 1.

Figure 3:
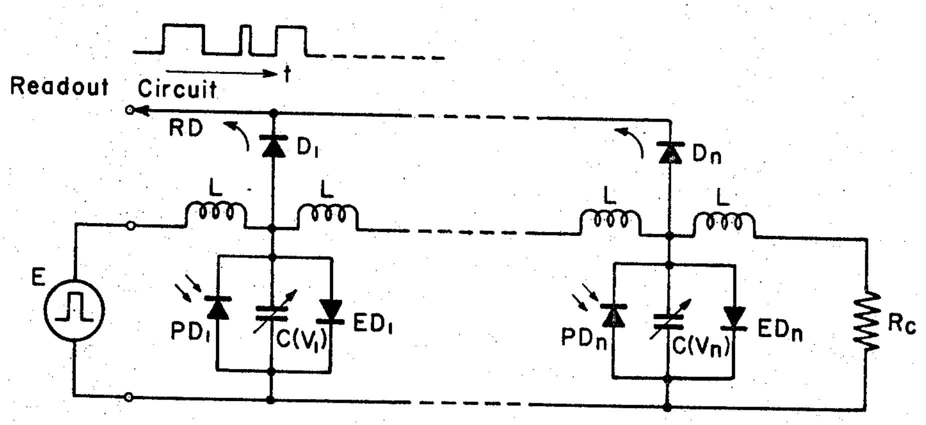
FIG. 3 is a view similar to FIG. 1 but illustrating the convension of a series of spatially distributed optical signals to a series of electrical signals successively arranged with respect to time.

FIG. 3 shows a camera apparatus embodying the principles of the invention. As shown in FIG. 3, each L–C–R network includes an optical-to-electrical conversion or optical detection element such as a photo diode PD, a variable capacitance element C(V) and an Esaki diode ED connected in parallel circuit relationship. In other respects the arrangement is substantially similiar to that shown in FIG. 1. A series of spatially distributed optical signals are applied to the photo diodes $PD_1 \ldots PD_n$ respectively where they are converted to photoelectric signals which in turn, vary the capacitance of the associated element $C(V_1) \ldots C(V_n)$. A scanning pulse from a source E is width modulated by each network in the same manner as previously described in conjunction with FIG. 1. Thus it will be appreciated that the arrangement is operative to convert the optical signals from a spatial distribution to a time distribution.

If the photo-diode PD is connected in series to the Esaki diode ED then the read out pulse is amplitude modulated.

Figure 4:
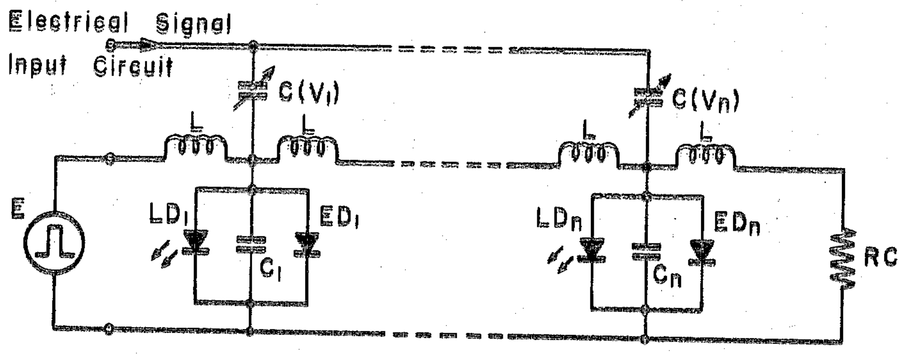
FIG. 4 is a schematic circuit diagram of a variable impedance active pulse transmission system for converting a series of electric signals successively arranged with respect to time to a series of spatially distributed optical signals in accordance with the principles of the invention.

FIG. 4 shows an arrangement similar in construction to that illustrated in FIG. 3 except for a variable capacitance element C(V) substituting a read out diode and an electroluminescent element such as a laser diode LD substituting the photo-diode. An electrical signal is applied to the variable capacitance elements $$C(V_1) \ldots C(V_n)$$

to change their capacitance whereby the laser diodes $LD_1 \ldots LD_n$ change in luminous duration. Thus the electrical signal is converted to spatially distributed optical signals emitted by the laser diodes disposed at predetermined different locations to form an optical display apparatus.

Figure 5:
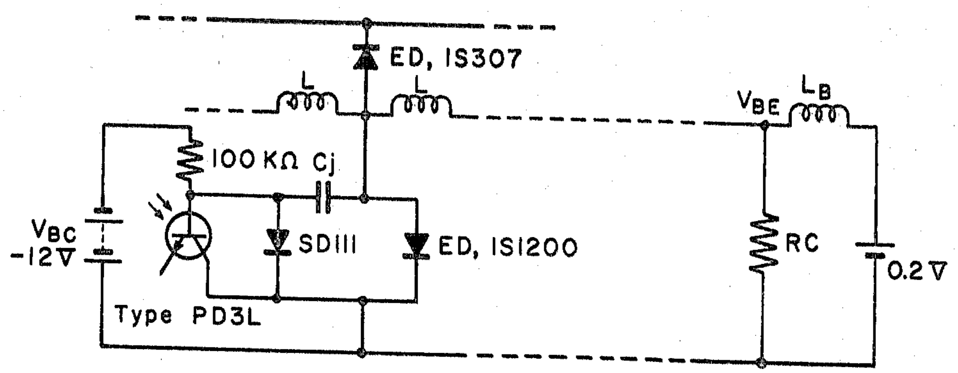
FIG. 5 is a schematic circuit diagram of a modification of FIG. 3.

As an example, FIG. 5 denotes various circuit parameters found to be satisfactorily operated with the arrangement shown in FIG. 3. It is to be noted however that the invention is not limited to the circuit parameters denoted in FIG. 5. With no light incident upon each photo transistor Type PD3L, a dark current flowing therethrough provided a voltage of approximately $-10$ volts for a silicon capacitor Type SD III. Then the capacitor had a capacitance $C_o$ of approximately 10 pico-farads. When a light having an illuminance of 200 luxes falling upon each phototransistor the capacitor had its capacitance $C_l$ changed to approximately 20 pico-farads with a current of approximately 100 micro-amperes flowing through the phototransistor. As previously described, a pulse propagated through the arrangement or along a neuristor line has a pulse width of $W=k\sqrt{LC}$ where $k$, L and C have the same meaning as previously defined. Therefore the irradiation of light as above described causes the pulse width to change from $K\sqrt{LC_0}$ to $K\sqrt{LC_1}$ that is to increase by a factor of approximately $\sqrt{2}$. In other words, the pulses had a pulse width approximately equal to $\sqrt{2}$ time the original pulse width.

Upon designing the arrangement, the series inductance L was determined by both a propagation time of pulse $K\sqrt{LC}$ where $K_1$ is a constant and a pulse width of the propagated pulse $K\sqrt{LC_0}$. Thus the line had the substantially matched impedance $R_c$ expressed by $$RC\leqq\sqrt{L/C}$$

Then the Esaki diode Type IS1200 was preselected to meet the condition for neuristor or $|-G|>\sqrt{C_0/L}$ as previously described to permit pulses to be propagated along the line without any reflection and attention. The reference character $C_j$ designates a DC blocking capacitor having a capacitance preselected to provide a suitable time constance in accordance with a change in incident light with respect to time.

Figure 6:
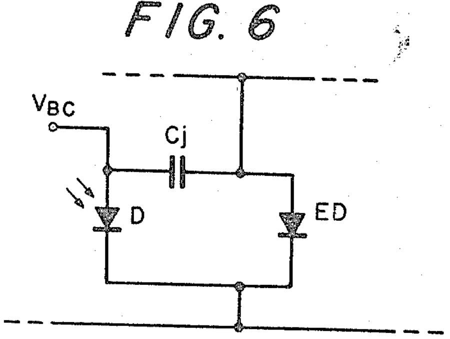
FIG. 6 is a fragmental view of another form of one section usable in the arrangements shown in FIGS. 3 and 4.

While the invention has been described in terms of the several preferred embodiments thereof consrtucted through the use of lumped parameter elements commercially available, it is to be understood that various changes in the details of construction and the arrangement and combination of parts may be resorted to without departing from the spirit and scope of the invention. For example, as the optical-to-electrical conversion or optical detection element PD and the variable capacitance element C(V) each may be composed of a p-n semiconductor junction, the functions of both elements may be advantageously performed by a single p-n junction diode D as shown in FIG. 6 for the purpose of simplifying the resulting construction. Also it is to be understood that a hyper-abrupt junction diode or an optical detection element composed of a p-j-n junction diode may be advantageously used in order to increase a change in capacitance of a variable capacitance element in response to the application of an input signal.

Further if an optical detection element is composed of a hetero-junction diode, the element will change in a flow of photocurrent therethrough in accordance with a wavelength of light incident upon the same. This makes it possible to width modulate an output pulse with the wavelength of light. In addition, the input signal may be composed of thermal, pressure, or magnetic information or any radioactive radiation with the satisfactory results.

What I claim is:

1. A variable impedance active pulse transmission system for converting signals from one to the other of spatial and time distributions, comprising a plurality of L–C–R networks disposed at predetermined, spatially different locations and electrically connected in cascade to each other, each of said networks having an output impedance substantially equal to an input impedance of the next succeeding network, the last one of said networks terminating in an impedance substantially equal to the output impedance thereof, a source of scanning pulse electrically connected across the cascade connection of said networks, a series of signals applied to said network each of said networks including in addition to an inductance, at least one variable impedance responsive to a different one of said signals to change in impedance, an Esaki diode responsive to a scanning pulse from said source to have a negative resistance less than the output impedance of that network to perform the operation of self-shaping said pulse thereby to width modulate it, and means for indicating the modulated pulses.

2. A variable impedance active pulse transmission system for converting a series of spatially distributed signal to a series of signals successively arranged with respect to time, comprising a plurality of T-shaped L–C–R networks disposed at predetermined different locations and electrically connected in cascade to each other, each of said networks having an output impedance substantially equal to an input impedance of the next succeeding network, the last one of said networks terminating in an impedance substantially equal to the output impedance thereof, a source of scanning pulse electrically connected across the cascade connection of said networks, a series of signals applied to said networks, each of said network including a series element composed of a pair of serially connected inductive elements and at least one shunt element composed of variable impedance elements responsive to a different one of said signals to change in impedance and an Esaki diode responsive to the scanning pulse from said source to have a negative resistance less than the output impedance of that network to perform the operation of self-shaping said pulse thereby to width modulate it, and a reading out circuit including a plurality of reading out circuit including a plurality of reading out semiconductor diodes each electrically connected a different one of the junctions of the serially connected inductances.

3. A variable impedance active pulse transmission system as claimed in claim 2 wherein said variable impedance element is a variable capacitance semiconductor element.

4. A variable impedance active pulse transmission system as claimed in claim 2 wherein said variable impedance element is a variable inductance element.

5. A variable impedance active pulse transmission system as claimed in claim 2 wherein said variable impedance element includes an optical detection element responsive to an optical signal applied thereto to change a magnitude of photoelectric current flowing therethrough, and a variable capacitance semiconductor diode connected across said optical detection element to respond to said change in photoelectric current to change in capacitance.

6. A variable impedance active pulse transmission system as claimed in claim 2 wherein a variable resistance element is operatively coupled to said Esaki diode thereby to permit the amplitude modulation of said pulse.

7. A variable impedance active pulse transmission system for converting a series of signals successively arranged with respect to time to a series of spatially distributed signals, comprising a plurality of T-shaped L–C–R networks disposed at predetermined different locations and electrically connected to in cascade to each other, each of said network having an output impedance substantially equal to an input impedance of the next succeeding network, the last one of said networks terminating in an impedance substantially equal to the output impedance thereof, a source of scanning pulse, a series of signals applied to said networks, each of said networks including a series element composed of a pair of serially connected inductive elements and a shunt element composed of an electroluminescent element and an Esaki diode disposed in parallel circuit relationship and an input circuit including a plurality of variable impedance elements each connected to a different one of the junctions of said serially connected inductances, each of said variable impedance element being responsive to an electrical signal flowing through said input circuit to change in impedance, said Esaki diode being responsive to a scanning pulse from said source to have a negative resistance less than the output impedance of the associated network to perform the operation of self-shaping the pulse, said electroluminescent element being responsive to both a change in impedance of said variable impedance element and said pulse to emit a light having a duration determined by said change in impedance.

8. A variable impedance active pulse transmission line as claimed in claim 7 wherein said variable impedance element is a variable capacitance semiconductor diode.

9. A variable impedance active pulse transmission line as claimed in claim 7 wherein said variable impedance element is a variable inductance element.

References Cited

UNITED STATES PATENTS

| | | | |
|---|---|---|---|
| 2,585,571 | 2/1952 | Mohr. | |
| 3,051,846 | 8/1962 | Schott | 307—286 |
| 3,173,026 | 3/1965 | Nagumo | 307—286 |
| 3,316,425 | 4/1967 | Lundberg et al. | 307—286 |

DONALD D. FORRER, Primary Examiner

H. A. DIXON, Assistant Examiner

U.S. Cl. X.R.

307—286, 320, 311; 333—80